July 14, 1959 M. L. JOFEH 2,894,396
APPARATUS RESPONSIVE TO ANGULAR VELOCITIES OF A PLATFORM
Filed Sept. 8, 1949 3 Sheets-Sheet 2

INVENTOR
MARCUS LIONEL JOFEH.
BY
ATTORNEY

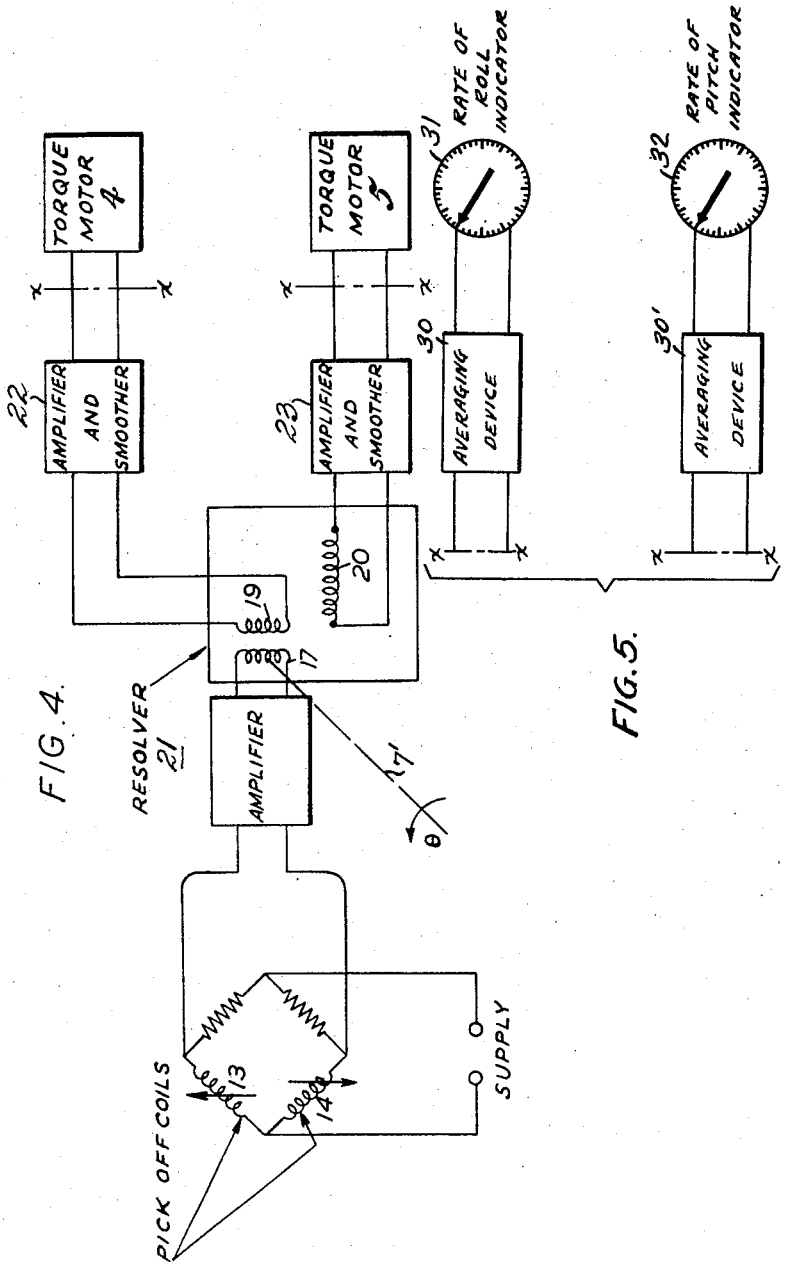

United States Patent Office 2,894,396
Patented July 14, 1959

2,894,396

APPARATUS RESPONSIVE TO ANGULAR
VELOCITIES OF A PLATFORM

Marcus Lionel Jofeh, Bonds Mill, Stonehouse, England, assignor to The Sperry Gyroscope Company Limited, Brentford, England, a company of Great Britain Application September 8, 1949, Serial No. 114,584

Claims priority, application Great Britain
September 9, 1948

17 Claims. (Cl. 74—5.37)

The present invention relates to gyroscopic apparatus responsive to the angular velocity of a platform on which it is mounted.

A known type of gyroscopic apparatus responsive to the angular velocity of a platform consists of a simple rate-of-turn gyroscope comprising a gyroscope mounted on the platform for constrained precession of its rotor and gimbal frame against a spring about an axis normally perpendicular to the axis about which the angular velocity is to be detected. In such apparatus the angle through which the gyroscope precesses when the platform changes from one state of motion to another is approximately proportional to the difference between the angular velocities of the platform in the two states. Whilst such gyroscopic apparatus is very satisfactory for detecting and measuring angular velocities of relatively large magnitude such as the rates of turn of aircraft or ships with sufficient accuracy for purposes hitherto required, a difficulty arises if it is desired to detect very minute angular velocities. This difficulty is in defining a zero position for the gimbal frame that shall correspond accurately to zero angular velocity of the platform so that a very minute angular velocity of the platform in one sense or the other shall be indicated as a precession in the corresponding direction of the gimbal frame from this zero. The difficulty arises both in determining this zero and in maintaining it due to zero error in the spring constraint, particularly when this is of the kind that permits angular deflection in either direction from the zero position to which it tends to centralize the constrained member, and also because of manufacturing inaccuracies and lack of balance.

If it is desired to detect angular velocities about two different axes, two rate-of-turn gyroscopes have had to be used hitherto.

It is an object of the present invention to provide gyroscopic apparatus which is responsive to extremely small angular velocities and yet is substantially free from the so-called zero errors.

According to one feature of the present invention, there is provided gyroscopic apparatus responsive to the component angular velocities of a platform about two predetermined mutually perpendicular axes defined with reference to the platform comprising a turntable mounted on the platform for rotation about an axis perpendicular to the said axes, a rate-of-turn gyroscope mounted on the turntable for constrained precession of its rotor and supporting frame or housing about an axis normal to the turntable axis, so that, when the turntable is continuously rotated, the precession axis is also continuously rotated about the turntable axis, with the result that, during an angular velocity of the platform, the gyroscope will cyclically precess, a pickoff arrangement for detecting the angular movements of the gyroscope about its precession axis and supplying a signal, a two-part sine-and-cosine resolving device that has one part rotating synchronously with the turntable and the other part fixed relatively to the platform, that is connected to receive the signal from the pickoff, and that is arranged to derive therefrom two component signals each dependent on the pickoff signal and on the angular position of one part of the resolving device relatively to the other in such a way that the average values of the two component signals over a rotation period of the turntable represent the component angular velocities of the platform about the predetermined axes.

A suitable averaging device may be provided for determining the average value of the output from the resolving device which average value will then constitute a measure of the angular velocity of the platform about the desired axis.

That zero errors of the rate gyroscope are balanced out in the present invention by virtue of the rotation of the turntable and the rotating resolver, can be seen by consideration of an example in which the gyroscope has for some reason a tendency to rotate about its precession axis due to a torque acting on it even when the platform has no angular velocity. Such a torque may be due to unbalance of the gyroscope about its precession axis or to a zero error in the spring constraints. Whatever the error may be that this error torque produces in the deflection of the gyroscope in one position of the turntable about the rotating axis, it will produce a corresponding error of opposite sense in the deflection of the gyroscope when the rotating frame has turned through 180° from that position. The error therefore disappears from the average of the outputs due to these two deflections.

According to another feature of the invention the resolving device may be of the kind which resolves a signal associated with a variable direction into components associated with two mutually perpendicular fixed directions, the amplitudes of the components being respectively proportional to the sine and cosine of the angle made by the variable direction with one of the fixed directions. With such a resolving device the gyroscopic apparatus may be used to provide information concerning the component angular velocities of the platform about two mutually perpendicular axes of support. The resolving device provides two cyclically varying outputs which may be applied to suitable averaging devices whose outputs will be measures of the component angular velocities of the platform about the two perpendicular axes.

A known use for angular-rate detecting apparatus is for realizing a stabilized platform on an unstable craft, such as an aircraft. In such use angular-rate gyroscopes are used to detect angular velocities of the platform about two perpendicular axes and provide signals which energize torque-motors associated with the platform for nullifying the angular movements of the platform, which may have a stabilizing gyroscope mounted on it so that the angular velocity of the platform is also a precessional angular velocity of the stabilizing gyroscope.

The present invention is particularly useful for realizing a stabilized platform in this way, since on the one hand, only one angular-rate detecting gyroscope needs to be used for stabilizing the platform about two axes, and on the other hand, very small angular velocities can be detected free from zero errors, so that the platform may be stabilized with considerable accuracy. Furthermore, the rotating turntable may act as a stabilizing gyroscope.

An embodiment of the invention will now be described by way of example with reference to the accompanying drawings, in which Fig. 1 illustrates schematically a platform having gyroscopic apparatus mounted on it for stabilizing it in space about its axes.

Fig. 4 is a circuit diagram of the apparatus.

Fig. 5 is a diagram illustrating a modified form of the invention, the modification consisting in replacing that portion of Fig. 4 above the broken lines X—X, by the circuits of Fig. 5.

Figure 1:
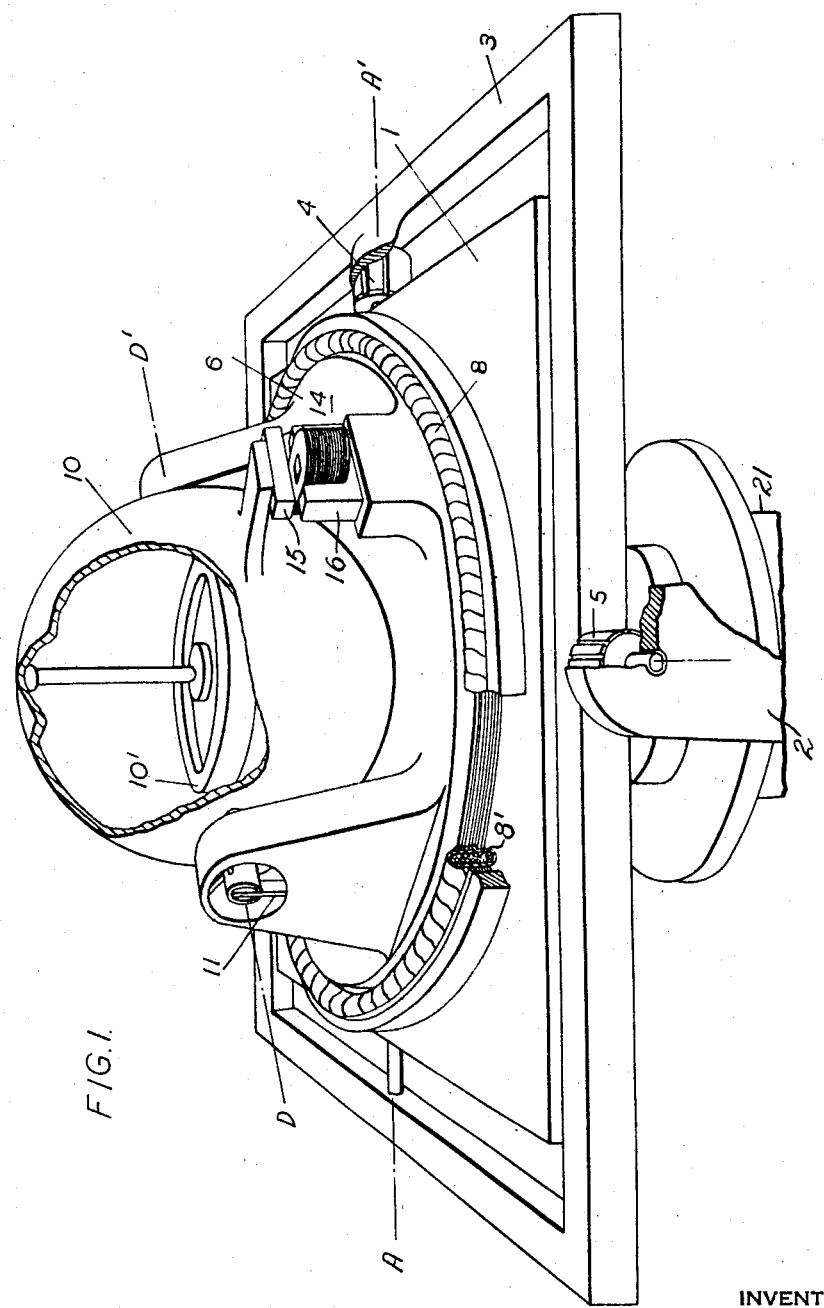

The platform is designated by the reference numeral 1, and is shown as mounted for movement about two normally-horizontal, mutually-perpendicular axes, AA', BB', in a support, 2, which is adapted for mounting on a moving craft by means of an intermediate gimbal frame, 3. Mounted so as to apply torques to the platform about the axes, AA', BB', are two electrical torque motors, 4, 5 which may be of well-known form and are arranged to be energized from electrical signals received on tilt of the platform as will be hereinafter described in greater detail.

On the platform, 1, the gyroscopic apparatus in accordance with one embodiment of the present invention is mounted so as to detect angular velocities due to tilting of the platform.

Figure 2:
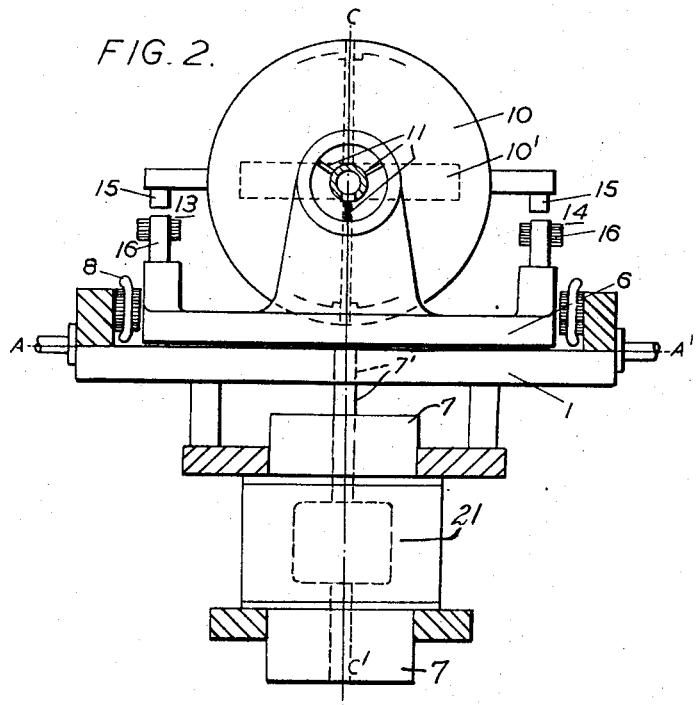
Fig. 2 illustrates a view, partly in section, as seen along the axis DD' of Fig. 1 with the resolving mechanism shown but the support omitted.
Figure 3:
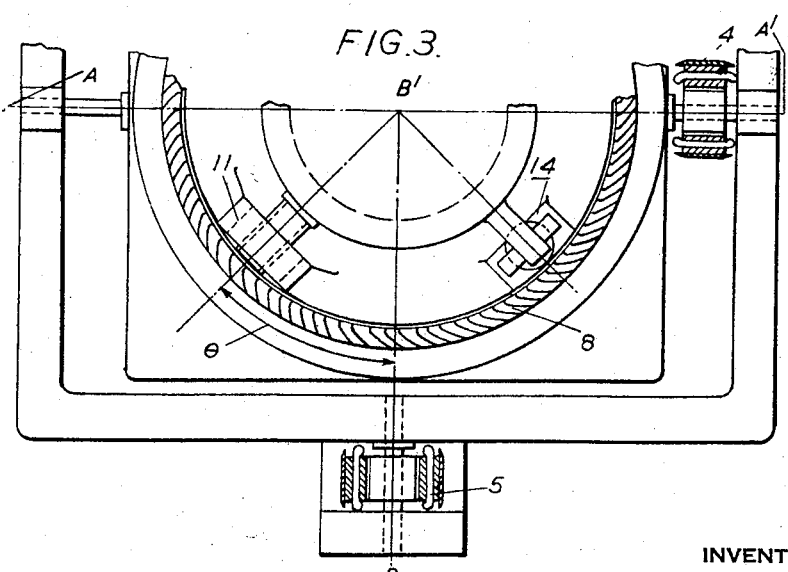
Fig. 3 is a plan view of part of the apparatus partly in section and with the pick-offs shown in greater detail.

The gyroscopic apparatus comprises a turntable, 6 (Figs. 1 and 2), which is mounted on the platform, 1, for rotation about a normally vertical axis, CC', by means of bearings 7. The turntable, 6, is rotated by means of the motor 8, having stator windings 8' fixed to platform 1. The turntable, 6, is of sufficient mass and is rotated at sufficient speed to form a stabilizing gyroscope in itself, that is, it is capable of maintaining the platform, 1, stabilized in space about its two axes, AA', BB', for an appreciable length of time. The turntable has an angular momentum of a magnitude at least of the order of magnitude of the angular momentum of the rate gyroscope hereinafter described.

On the turntable, 6, there is mounted a rate-of-turn gyroscope which is shown as comprising a casing, 10, supported on supports, 11, 12, for constrained precessional movement about a normally horizontal axis, DD'. The casing, 10, contains a rotor 10' which is mounted for spinning about a normally vertical axis coincident with the axis of the turntable 6. In order that the rate-of-turn gyroscope shall accurately and sensitively detect small rates of angular movement of the platform, 1, the housing, 10, is mounted as accurately as possible in neutral equilibrium about the precession axis and the bearing support for the housing, 10, is comprised of blade spring assemblies, one of which is shown as having springs 11, in order to reduce friction to a minimum. These blade springs permit angular movement of the housing, 10, relative to the turntable, 6, about an axis defined by the blade spring mounting and substantially prevent translatory movement of the housing, 10, relative to the axis, DD'. It will thus be seen that these blade springs, besides providing a frictionless bearing support for the housing, 10, also provide the necessary spring constraint for the rate-of-turn gyroscope.

More specifically the spring blade mounting comprises two sets of three blade springs 11 extending in three planes normal to the axis, DD', angularly spaced by 120° and axially displaced from each other by small amounts.

A pair of balanced electrical pick-off devices, 13, 14, are shown for detecting angular movements of the housing 10, about the precessional axis DD'. The pick-off devices are of the inductive kind and each comprises two parts, 15, 16, one part 15, attached so as to move with the housing, 10, and the other, 16, attached to the turntable, 6. The pick-off devices are so connected (see Fig. 4) that during angular movement about the axis, DD', the signals generated are additive but if any translatory movement takes place the signals generated are opposed and substantially cancel each other out.

The pick-off devices, 13, 14 (Fig. 4) are connected so as to apply their amplified output to one part, winding 17, of a two part sine-cosine resolving mechanism 21, said part, 17, being mounted on shaft 7' for synchronous rotation with the turntable, 6 and with its axis parallel to the precession axis and the other part, windings 19 and 20, of the resolving mechanism being attached to the platform 1. The winding 19 is mounted substantially parallel to the axis BB' and winding 20 is mounted at right angles thereto. The winding, 19, is connected to the torque-motor 4 through amplifier 22 and the winding, 20, to the torque-motor, 5 through amplifier 23.

In operation if the platform 1 tilts about an axis whilst the turntable, 6, is rotating, the housing, 10, will cyclically precess about the axis DD' and a cyclically varying signal will be derived from the pickoff devices, 13, 14 whose instantaneous value is substantially proportional to the angular deflection of the housing, 10, and therefore to the angular velocity of the platform, 1, about the axis instantaneously coinciding in direction with the precession axis. This signal is resolved in the resolving mechanism into two component signals in the windings, 19, 20, representing by their average values the component angular velocities of the platform about two axes defined by the windings 20, 19 respectively. The signals from the windings, 19, 20 are amplified and smoothed by amplifier 22 and 23, respectively, and applied to energise the torque motors, 4, 5, respectively and since the turntable, 6, behaves like a gyroscope, it is only slowly responsive to the torques applied by the torque motors and therefore acts as an averaging device. The platform will therefore have applied to it forces tending to produce component angular velocities about the axes, AA', BB' substantially equal and opposite to the error component velocities about those axes so that these error component velocities are substantially nullified.

It will be appreciated that various modifications may be made to the specific details hereinbefore disclosed by way of example without in any way departing from the scope of the invention.

For example the turntable, 6, need not be constructed as to behave like a gyroscope by omitting its gimbal mounting and a suitable averaging device, for example, electrical averaging devices 30, 30' (Fig. 5), may be provided for deriving the average values of the signals in the windings 19, 20. The outputs from the averaging devices then represent the component angular velocities of the platform about the axes defined by the windings 20, 19 respectively, and may be applied to rate of roll indicator 31 and rate of pitch indicator 32, as shown in Fig. 5. Also, if desired, the outputs of the averaging devices 30, 30' may be applied to roll and pitch servomotors tending to produce angular velocities of the platform nullifying the error angular velocities. These servomotors will, of course, for a corresponding resolving device, be disposed in quadrature to the torque motors 4 and 5.

I claim:

1. Gyroscopic apparatus responsive to the component angular velocities of a platform about two predetermined mutually perpendicular axes defined with reference to the platform comprising a turntable mounted on the platform for rotation about an axis perpendicular to the said axes, a rate-of-turn gyroscope mounted on the turntable for constrained precession of its rotor and supporting frame or housing about an axis normal to the turntable axis, so that, when the turntable is continuously rotated, the precession axis is also continuously rotated about the turntable axis, with the result that, during an angular velocity of the platform, the gyroscope will cyclically precess, a pickoff arrangement for detecting the angular movements of the gyroscope about its precession axis and supplying a signal, a two-part sine-and-cosine resolving device that has one part rotating synchronously with the turntable and the other part fixed relatively to the platform, that is connected to receive the signal from the pickoff, and that is arranged to derive therefrom two component signals each dependent on the pickoff signal and on the angular position of one part of the resolving device relatively to the other in such a way that the average values of the two component signals over a rotation period of the turntable represent the component angular velocities of the platform about the predetermined axes.

2. Gyroscopic reference apparatus as claimed in claim 1, having means for providing component signals dependent on the measures of the said component velocities and means, such as servo motors, responsive to said component signals for substantially nullifying the said component angular velocities of the platform, whereby the platform is stabilized about the said two axes.

3. A gyroscopic reference apparatus as claimed in claim 2, including averaging devices for averaging said component signals from said resolving mechanism and rate of roll and rate of pitch indicators controlled by the output of said devices.

4. Gyroscopic reference apparatus as claimed in claim 2, including averaging devices for averaging the component signals from the resolving mechanism before applying them to said servomotor.

5. Gyroscopic reference apparatus according to claim 1 wherein the turntable undergoes continuous rotation at a sufficient angular velocity, and has sufficient moment of inertia about its axis, for it to act as a gyroscope whose angular momentum is at least of the same order of magnitude as that of the rate gyroscope.

6. Gyroscopic reference apparatus as set forth in claim 1 wherein the resolving device comprises a winding mounted for synchronous rotation with the turntable and having its axis normally parallel to the precession axis of the gyroscope and a pair of windings inductively coupled to the first winding and carried on the platform with their respective axes parallel to the axes of the platform when these are parallel to a plane containing the axes of windings.

7. Gyroscopic reference apparatus as set forth in claim 1 wherein the pickoff arrangement comprises a pair of inductive pickoffs disposed 180° apart and each comprising two parts, one part mounted on the gyroscope housing and the other on the turntable, the two pickoffs being electrically connected so that the signals produced therein due to precessional movements are additive whereas any signals produced therein during relative translatory displacements of the housing oppose each other.

8. Gyroscopic reference apparatus as set forth in claim 1 wherein the rate-of-turn gyroscope is mounted on the turntable by means of two spaced spring-bearing assemblies adapted to permit frictionless angular movement of the gyroscope about the precession axis while preventing translatory movement thereof relative to the turntable.

9. Gyroscopic reference apparatus as claimed in claim 8 wherein each spring-bearing assembly comprises three spring blades angularly spaced by 120° and axially displaced from each other by small amounts.

10. A gyroscopic rate of turn indicator, comprising a universally mounted support, a rotor mounted for spinning about an axis, a rotor bearing frame for said rotor pivoted on said support about an axis normal to said spin axis, whereby precession about said second axis is caused by tilting or turning of said support about a third axis normal to said two other axes, means for opposing and means for detecting such precession, and means for spinning said support about an axis normally in line with said spin axis, whereby upon turning of said support about said third axis variable signals will be produced by said detecting means varying both with the rate of such turn and the instantaneous position of said support in its rotation about said spin axis.

11. A gyroscopic rate of turn indicator, as claimed in claim 10, also having a component resolver actuated from said support for resolving the signal from said detector into a component about said turn axis.

12. A gyroscopic rate of turn indicator as claimed in claim 10, also having a component resolver actuated from said support for resolving the signal from said detector into components about two axes, and motive means acting about said two axes actuated from said component outputs for stabilizing said support.

13. Gyroscopic reference apparatus according to claim 1, having torque motors for applying a torque to the platform about each of its axes, said torque motors being controlled by the component signals from said resolving device adapted to apply torques to the platform in a direction to cause precession of said rate of turn gyroscope in a direction to eliminate the component signal.

14. A gyroscopic rate of turn device, comprising a support, a rotor mounted for spinning about an axis, a rotor bearing frame for said rotor pivoted on said support about an axis normal to said spin axis, whereby precession about said second axis is caused by angular movement of said support about a third axis of turn detection normal to said two other axes, resilient means for opposing such precession, means for producing a signal upon such precession, means for rotating said support about an axis normally in line with said spin axis, whereby the position of said axis of detection continuously varies and said signals will be generated upon angular movement about two axes of detection normal to one another, a component resolver, a part of which is rotatable with said support for separating said signals responsive to turn about one of said axes of detection from tilt about the other of said axes, and indicators actuated by said signals showing the rate of turn about each of said axes.

15. A gyro vertical comprising a universally mounted platform about two normally horizontal gimbal axes, servomotors for stabilizing the same about each of said axes, a support rotatably mounted on said platform, means for rotating said support to constitute a gyroscope having a vertical spin axis, a second smaller gyroscope mounted on said support for spinning about a normally vertical spin axis and oscillation about a normally horizontal trunnion axis, means for producing a signal on precessional movements of said gyroscope about said trunnion axis, a resolver for separating said signals into trains or component groups responsive to tilt of said platform about each of its gimbal axes, and servomotors actuated from the resolved trains for stabilizing the platform.

16. Gyroscopic reference apparatus as set forth in claim 1, also having electrical averaging devices for averaging the component signals from the resolving mechanism and rate of roll and pitch indicators controlled by the respective outputs of said devices.

17. A gyroscopic rate of turn indicator for craft, comprising a support pivotally mounted about normally horizontal axes, such as the roll and pitch axes of the craft, a rotor mounted for spinning about a normally vertical axis, a rotor bearing frame for said rotor pivoted on said support about a normally horizontal precession axis, spring centralizing means between said frame and support whereby precession about said horizontal axis is caused by tilting of said support about an axis having a component normal thereto, means for detecting such precession and producing thereby a signal, and means for spinning said support about a normally vertical axis whereby upon tilt of said support about either of said horizontal axes variable signals will be produced by said detecting means varying both with the rate and direction of such tilt and the instantaneous position of the precession axis in its rotation about the vertical axis of said support.

References Cited in the file of this patent

UNITED STATES PATENTS

| | | |
|---|---|---|
| 1,501,886 | Abbot | July 15, 1924 |
| 1,801,619 | Arrea | Apr. 21, 1931 |
| 1,942,470 | Bassett | Jan. 9, 1934 |
| 2,417,081 | Lynn | Mar. 11, 1947 |

FOREIGN PATENTS

| | | |
|---|---|---|
| 599,826 | Great Britain | Mar. 22, 1948 |